US009531866B2

(12) United States Patent
Lu et al.

(10) Patent No.: US 9,531,866 B2
(45) Date of Patent: Dec. 27, 2016

(54) MITIGATION OF DISCONNECT EVENTS IN VECTORING BASED DSL SYSTEMS (71) Applicant: Telefonaktiebolaget L M Ericsson (publ), Stockholm (SE)

(72) Inventors: Chenguang Lu, Sollentuna (SE); Tomas Andreason, Stockholm (SE); Miguel Berg, Upplands Väsby (SE); Per-Erik Eriksson, Stockholm (SE); Elmar Trojer, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/653,286

(22) PCT Filed: Dec. 21, 2012

(86) PCT No.: PCT/SE2012/051476
§ 371 (c)(1),
(2) Date: Jun. 18, 2015

(87) PCT Pub. No.: WO2014/098684
PCT Pub. Date: Jun. 26, 2014

(65) Prior Publication Data
US 2015/0341487 A1  Nov. 26, 2015

(51) Int. Cl.
*H04M 1/24* (2006.01)
*H04M 3/08* (2006.01)
(Continued)

(52) U.S. Cl.
CPC ............ *H04M 3/2209* (2013.01); *H04B 3/32* (2013.01); *H04B 3/487* (2015.01); *H04M 3/18* (2013.01); *H04M 3/34* (2013.01); *H04M 11/062* (2013.01)

(58) Field of Classification Search
CPC .... H04M 11/062; H04M 3/18; H04M 3/2209; H04M 3/34
(Continued)

(56) References Cited

U.S. PATENT DOCUMENTS

2010/0278222 A1* 11/2010 De Lind Van Wijngaarden et al. .................... H04M 11/062
375/220
2011/0007623 A1* 1/2011 Cendrillon ............... H04B 3/32
370/201

FOREIGN PATENT DOCUMENTS

WO  2011/152768 A1  12/2011

OTHER PUBLICATIONS

International Telecommunication Union, Series G: Transmission Systems and Media Digital Systems and Networks, Recommendation ITU-T G.993.2; Digital sections and digital line system—Access networks; "Very high speed digital subscriber line transceivers 2 (VDSL2)," Dec. 2011.
(Continued)

*Primary Examiner* — Quoc D Tran
(74) *Attorney, Agent, or Firm* — Patent Portfolio Builders PLLC (57) ABSTRACT

There is provided mitigation of disconnect events in a vectoring based digital subscriber line, DSL, system. A method performed by a digital subscriber line access multiplexer, DSLAM, comprises detecting a loss of signal or disconnect event of a line in a vectored group of DSL lines, the loss of signal or disconnect event causing a negative impact on the DSL system. The method further comprises detecting a change in at least one downstream, DS, crosstalk coefficient of at least one line in said vectored group of DSL lines. The method further comprises determining a magnitude of said change. The method further comprises determining where the loss of signal or disconnect event has
(Continued)

occurred by processing precoding coefficients of the vectored group of DSL lines. The method further comprises determining, on basis of the determined magnitude and where the loss of signal or disconnect event has occurred, an action to be performed by the DSLAM so as to mitigate for said negative impact.

25 Claims, 8 Drawing Sheets

(51) Int. Cl.
      *H04M 3/22*       (2006.01)
      *H04B 3/32*       (2006.01)
      *H04M 3/18*       (2006.01)
      *H04M 3/34*       (2006.01)
      *H04M 11/06*       (2006.01)
      *H04B 3/487*       (2015.01)

(58) Field of Classification Search
      USPC .............................. 379/1.03, 1.04, 24, 27.08
      See application file for complete search history.

(56) References Cited

OTHER PUBLICATIONS

International Telecommunication Union, Series G: Transmission Systems and Media, Digital Systems and Networks, Recommendation ITU-T G.993.5; Digital sections and digital line systems—Access networks; "Self-FEXT cancellation (vectoring) for use with VDSL2 transceivers," Apr. 2010.

International Telecommunication Union—Telecommunication Standardization Sector, "G. vector: Issues arising from vectoring tests at Swisscom," Temporary Document 2012-06-4A-022, Study Group 15, Antwerp, Belgium, Jun. 18-22, 2012.

International Search Report issued in corresponding International application No. PCT/SE2012/051476, date of the actual completion of the International search Sep. 9, 2013.

Written Opinion of the International Searching Authority issued in corresponding International application No. PCT/SE2012/051476, date of mailing Sep. 16, 2013.

\* cited by examiner

MITIGATION OF DISCONNECT EVENTS IN VECTORING BASED DSL SYSTEMS

TECHNICAL FIELD

Embodiments presented herein relate to vectoring based digital subscriber line, DSL, systems, and particularly to mitigation of disconnect events in such systems.

BACKGROUND

In mobile communication networks, there is always a challenge to obtain good performance and capacity for a given communications protocol, its parameters and the physical environment in which the mobile communication network is deployed.

Vectoring technology may be a core technology of the next generation of DSL (VDSL2; Very-high-speed digital subscriber line 2). It cancels the FEXT (far-end crosstalk) between DSL lines, and therefore maximizes DSL system performance. Vectoring technology will play a role in FTTX (Fiber To the Node/Cabinet Curb/Building/Home/Premises, etc.) business, because it enables offering 100 Mbps per user with DSL lines in the last hundred meters, i.e. between the end of a fiber network and the CPEs (Customer Premises Equipment).

ITU-T (Telecommunication Standardization Sector of the International Telecommunication Union) has been standardizing a vectoring standard G.993.5, and the first recommendation of G.993.5 was approved on April 2010. While G.993.5 specifies vectoring for VDSL2, the on-going next generation DSL standard ITU-T G.fast is now specifying vectoring as a mandatory feature. The cancellation of the FEXT is done at the DSLAM (Digital Subscriber Line Access Multiplexer side. The downstream FEXT is pre-cancelled by a precoder in the DSLAM, while the upstream FEXT is cancelled by an upstream crosstalk canceller in the DSLAM. The recommendation provides a way to estimate the FEXT channel in both downstream and upstream and utilize the estimated channel to cancel the crosstalk.

Recently, a reliability issue in vectoring referred to as CO (Central Office) disconnect event (CDE) has been observed. Particularly, some retrains have observed when a CDE happens. The retrain is caused by noise increase due to the CDE. This would interrupt the on-going services at least for the whole retrain time (up to 90 seconds). CDE occurs when one (or more lines) is disconnected unexpectedly at the CO side, e.g. at the MDF (main distribution frame). For example, this can be typical mistakes done by careless maintenance personnel. Such disconnect events may thus impair the performance of the DSL system.

Hence, there is still a need for an improved mitigation of disconnect events in vectoring based DSL systems.

SUMMARY

An object of embodiments herein is to provide improved mitigation of disconnect events in vectoring based DSL systems.

The inventors of the enclosed embodiments are based on the understanding that retrain should be avoided.

A particular object is therefore to provide improved mitigation of disconnect events in vectoring based DSL systems whilst avoiding retrain.

According to a first aspect there is presented a method of mitigating disconnect events in a vectoring based digital subscriber line, DSL, system. The method is performed by a digital subscriber line access multiplexer, DSLAM. The method comprises detecting a loss of signal or disconnect event of a line in a vectored group of DSL lines, the loss of signal or disconnect event causing a negative impact on the DSL system. The method further comprises detecting a change in at least one downstream, DS, crosstalk coefficient of at least one line in said vectored group of DSL lines. The method further comprises determining a magnitude of said change. The method further comprises determining where the loss of signal or disconnect event has occurred by processing precoding coefficients of the vectored group of DSL lines. The method further comprises determining, on basis of the determined magnitude and where the loss of signal or disconnect event has occurred, an action to be performed by the DSLAM so as to mitigate for said negative impact Advantageously this provides mitigation of disconnect events in vectoring based DSL systems whilst avoiding retrain.

Advantageously this enables control from the CO side and does not require any change at the CPE side.

Advantageously this method is applicable for general DS disconnect events.

Advantageously, according to some embodiments it may be differentiated if the disconnect occurred at the CO, the CPE or somewhere in between.

According to a second aspect there is presented a digital subscriber line access multiplexer, DSLAM, for mitigating disconnect events in a vectoring based digital subscriber line, DSL, system. The DSLAM comprises a processing unit arranged to detect a loss of signal or disconnect event of a line in a vectored group of DSL lines, the loss of signal or disconnect event causing a negative impact on the DSL system. The processing unit is further arranged to detect a change in at least one downstream, DS, crosstalk coefficient of at least one line in said vectored group of DSL lines. The processing unit is further arranged to determine a magnitude of said change. The processing unit is further arranged to determine where the loss of signal or disconnect event has occurred by processing precoding coefficients of the vectored group of DSL lines. The processing unit is further arranged to determine, on basis of the determined magnitude and where the loss of signal or disconnect event has occurred, an action to be performed by the DSLAM so as to mitigate for said negative impact.

According to a third aspect there is presented a computer program for mitigating disconnect events in a vectoring based digital subscriber line, DSL, system, the computer program comprising computer program code which, when run on a digital subscriber line access multiplexer, DSLAM, causes the DSLAM to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The present disclosure is now described, by way of example, with reference to the accompanying drawings, in which.

DETAILED DESCRIPTION

The inventive concepts will now be described more fully hereinafter with reference to the accompanying drawings, in which certain embodiments are shown. The inventive concepts may, however, be embodied in many different forms and should not be construed as limited to the embodiments set forth herein; rather, these embodiments are provided by way of example so that this disclosure will be thorough and complete, and will fully convey the scope of the inventive concepts to those skilled in the art. Like numbers refer to like elements throughout the description. In the flowcharts, any step illustrated in a box with dashed lines should be regarded as optional.

Figure 1:
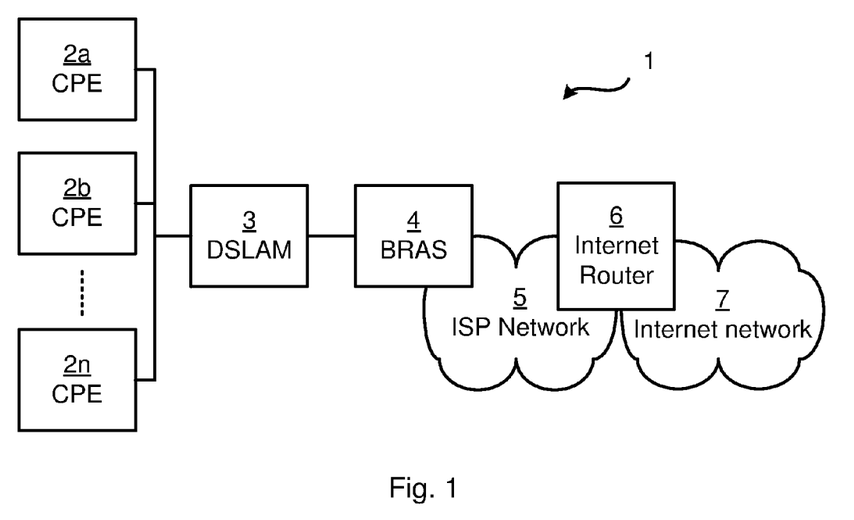
FIG. 1 is a schematic diagram illustrating a communications network where embodiments presented herein may be applied.

FIG. 1 is a schematic diagram illustrating a communications network 1 where embodiments presented herein can be applied. The communications network 1 comprises a digital subscriber line access multiplexer (DSLAM) 3. In general terms, the DSLAM 3 is a network device which may be located in the telephone exchanges of the telecommunications operators. The DSLAM 3 is arranged to connect multiple customer digital subscriber line (DSL) interfaces from customer premises equipment (CPE) 2a, 2b, . . . , 2n to a high-speed digital communications channel using multiplexing techniques. By CPE is meant any terminal and associated equipment located at a subscriber's premises and connected with a carrier's telecommunication channel(s). CPE generally refers to devices such as telephones, routers, switches, residential gateways (RG), set-top boxes, fixed mobile convergence products, home networking adaptors and internet access gateways that enable consumers to access Communications Service Providers' services and distribute them via a LAN (Local Access Network). The DSLAM 3 is arranged to collect data from its ports and to aggregate the traffic into complex composite signals via multiplexing. Depending on its architecture and setup, the DSLAM 3 is arranged to aggregate the DSL lines. The aggregated traffic from the CPEs 2a-n is by the DSLAM 3 directed to a broadband remote access server 4. The broadband remote access server (BRAS, B-RAS or BBRAS) 4 is arranged to route broadband traffic to and from broadband remote access devices such as DSLAMs 3 on an Internet service provider's (ISP) network 5. The BRAS 4 may also be referred to as a Broadband Network Gateway (BNG). An Internet Router 6 is arranged to provide communications between the ISP network 5 and an Internet network 7.

A CO (Central Office) disconnect event (CDE) is defined a retrain event when at least one line (i.e., one or more lines) is suddenly and unexpectedly disconnected from the CO side in a vectoring system and the disconnection causes some other lines to retrain. The CO is herein defined by the DSLAM 3. After a CDE, both DSLAM and CPE on the disconnected lines will continue to transmit for several seconds before they stop theirs transmissions, according to the VDSL2 standard. The continued transmissions could increase the noise level in both downstream (DS) and upstream (US) of other lines. The noise increase can cause the lines to retrain. In general terms, DS relates to communication from the DSLAM 3 to the CPE 2a-n, and US relates to communication from the CPE 2a-n to the DSLAM 3, see FIG. 2.

Figure 2:
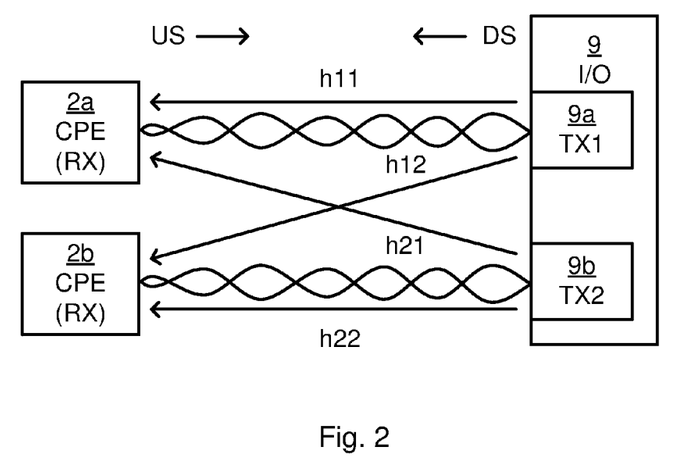
FIG. 2 is a schematic diagram illustrating communications between an I/O interface of a DSLAM and receivers of CPEs.

FIG. 2 illustrates the communications between the DSLAM 3 and the CPE 2a-n. In particular, FIG. 2 illustrates an input/output (I/O) interface 9 of the DSLAM 3. The I/O interface 9 comprises a first transmitter (TX1) 9a and a second transmitter (TX2) 9b. TX1 is arranged to communicate with the receiver (RX) of a first CPE 2a. TX2 is arranged to communicate with the receiver (RX) of a second CPE 2b.

First, in DS, the crosstalk from the disconnected line to other lines disappears. However, in vectoring, the signal transmitted on any line is precoded. The precoded signal comprises the linear combination of the desired signals to different lines, scaled by precoding coefficients. For example, at any tone, the precoded signal transmitted on line k, $x_k$, can be expressed as $$x_k = \sum_j p_{kj} s_j \qquad \text{Equation 1}$$

where $p_{kj}$ is the precoding coefficient from line j to line k and $s_j$ is the desired signal for line j.

At the receiver side, the precoded signal components after propagation (delay and attenuation) counteract the crosstalk of the same signal component so that the crosstalk is cancelled out. Ideally, the received signal of line k at the CPE is $y_k = h_{kk} s_k$, where $h_{kk}$ denotes the direct channel coefficient of line k, see FIG. 2 which by means of arrows schematically illustrates $h_{11}$, $h_{12}$, $h_{21}$, and $h_{22}$ for a system with two transmitters and two receivers. However, for CDE, the signal component of the disconnected line is only precoded to other lines and not coupled through the crosstalk channel. Assuming ideal cancellation, the received signal at the CPE of line k during a CDE of line i can be expressed as $$y_k = h_{kk} s_k + p_{ki} h_{kk} s_i \qquad \text{Equation 2:}$$

where the second term is a noise term. This noise is hereinafter referred to as precoding noise or precoding crosstalk. Due to the diagonal-dominance characteristics of the channel matrix, the level of the precoding noise is about the same as the crosstalk level from the disconnected line. As a result thereof, the precoding noise will increase the noise floor in the DS of the other lines (i.e. the non-disconnected lines).

Second, in US, the crosstalk is cancelled at the DSLAM 3 by the DSLAM 3 being arranged to post-process the received signals from all lines. In the DSLAM 3 a crosstalk canceller linearly combines the received signals from all lines, scaled by cancellation coefficients. During a CDE, the crosstalk from the US transmission of the disconnected to other lines still exists, as the CPE is still transmitting. For CDE, the received signal of the disconnected line disappeared. Therefore, the upstream crosstalk cannot be cancelled by the vectoring system. Due to the lack of the signal, the DSLAM 3 has insufficient degrees of freedom to cancel the crosstalk from the disconnected line. The uncancelled crosstalk will increase the noise floor in the US of other lines.

Figure 5:
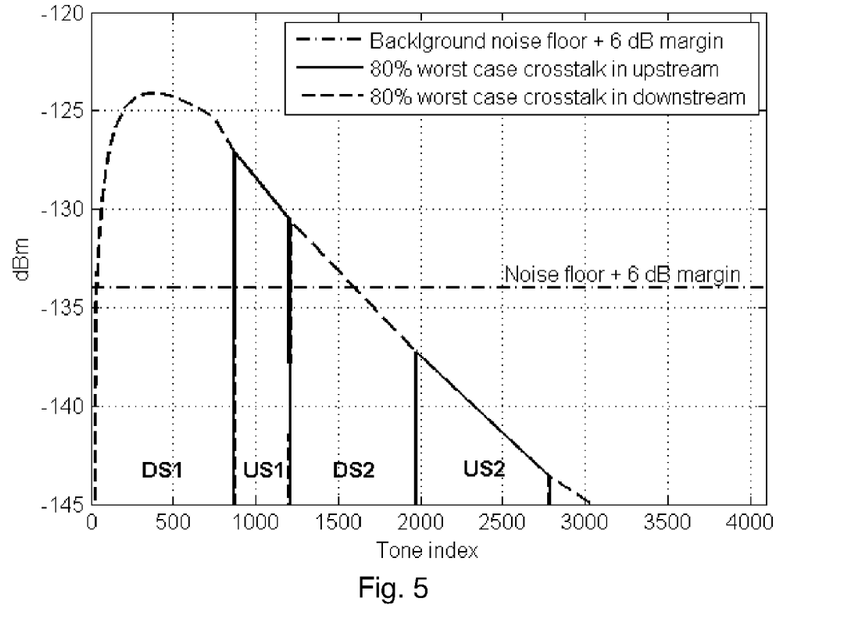
FIG. 5 schematically illustrates crosstalk as a function of tone index.

In summary, unless mitigated the noise level will increase in both DS and US. The phenomenon may appear like an alien crosstalk but in short time. When the noise level increase is more than the configured SNR margin (normally 6 dB) in either direction, the line would retrain. FIG. 5 illustrates 80% worst case crosstalk level in comparison with the noise floor (−140 dBm/Hz assumed) plus 6 dB SNR margin for a 500 meter AWG26 cable. In more detail, FIG. 5 shows an example how one crosstalker can increase the total noise level. This indicates that the impact of a CDE. It shows that an 80% worst case crosstalker for a 500 meters AWG26 cable is much higher than the background noise level (−140 dB)+6 dB margin in the DS1 and the US1 bands. In the illustrated case, the data carried in DS1 and US1 will be totally corrupted. This is furthermore enough to make the line retrain. It also indicates that at least 20% of the lines may retrain due to CDE of one line, thus indicating a severe reliability issue. FIG. 5 also shows that CDE affects more the lower frequency bands than the higher frequency bands. Hence the DS is more affected than the US by the CDE. The disconnection also causes impedance change at the CO side. The impedance change could further increase the crosstalk level. The impact from impedance change is not shown in FIG. 5.

Hence, a CDE can degrade the performance in DS and US. The embodiments disclosed herein relate to mitigation of the DS and US degradation. For example, in DS, mitigation may be accomplished by clearing the precoding coefficients. For example, in DS, the enclosed embodiments may be applied to a general disconnect event, i.e., at either the CO or the CPE or there in between. For example, in US, mitigation may be accomplished by relaxing the retrain criteria at the receiver and then triggering the data rate reduction to reduce packet errors.

In order to obtain mitigation of the DS and US degradation there is provided a DSLAM 3, methods performed by the DSLAM 3, a computer program comprising code, for example in the form of a computer program product, that when run on a DSLAM 3, causes the DSLAM 3 to perform the method.

Figure 3:
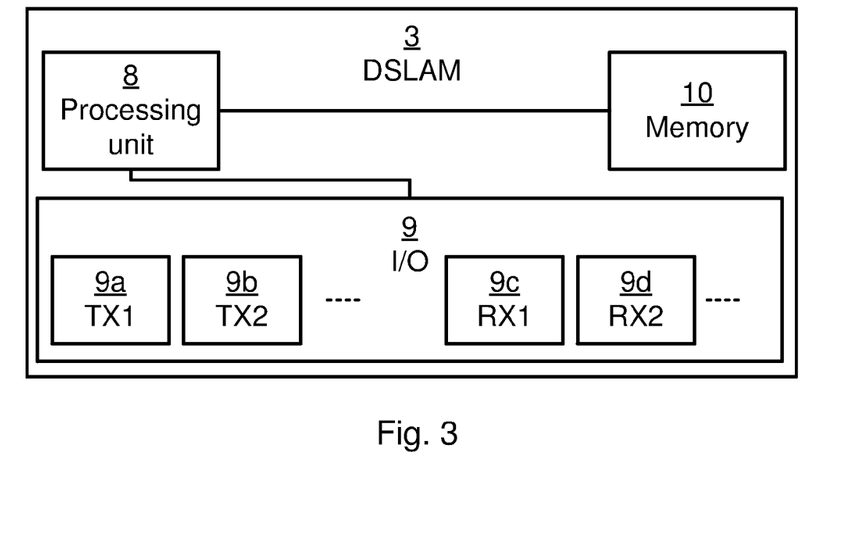
FIG. 3 is a schematic diagram showing functional modules of a DSLAM.

FIG. 3 schematically illustrates, in terms of a number of functional modules, the components of a DSLAM 3. A processing unit 8 is provided using any combination of one or more of a suitable central processing unit (CPU), multi-processor, microcontroller, digital signal processor (DSP), application specific integrated circuit (ASIC), field programmable gate arrays (FPGA) etc., capable of executing software instructions stored in a computer program product 11 (as in FIG. 4), e.g. in the form of a memory 10. Thus the processing unit 8 is thereby arranged to execute methods as herein disclosed. The memory 10 may also comprise persistent storage, which, for example, can be any single one or combination of magnetic memory, optical memory, solid state memory or even remotely mounted memory. The DSLAM 3 may further comprise an input/output (I/O) interface 9 for receiving and providing data messages to the CPE 2a-n and the BRAS 4. The I/O interface 9 comprises one or more transmitters TX1, TX2, . . . 9a, 9b and receivers RX1, RX2, . . . 9c, 9d. The processing unit 8 controls the general operation of the DSLAM 3, e.g. by sending control signals to the I/O interface 9. Other components, as well as the related functionality, of the DSLAM 3 are omitted in order not to obscure the concepts presented herein.

Figure 4:
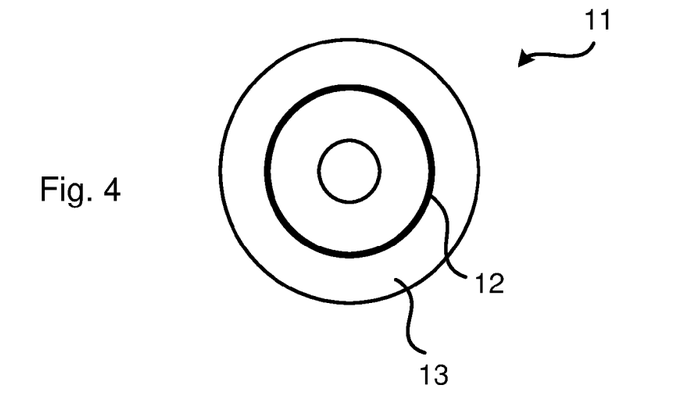
FIG. 4 shows one example of a computer program product comprising computer readable means.

FIGS. 9, 10a, 10b, and 10c provide flow charts illustrating embodiments of methods for mitigating disconnect events in a vectoring based digital subscriber line, DSL, system 1. The methods are performed in the DSLAM 3. The methods are advantageously provided as computer programs 12. FIG. 4 shows one example of a computer program product 11 comprising computer readable means 13. On this computer readable means 13, a computer program 12 can be stored, which computer program 12 can cause the processing unit 8 and thereto operatively coupled entities and devices, such as the memory 10 and the I/O interface 9 to execute methods according to embodiments described herein. In the example of FIG. 4, the computer program product 11 is illustrated as an optical disc, such as a CD (compact disc) or a DVD (digital versatile disc) or a Blu-Ray disc. The computer program product 11 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 12 is here schematically shown as a track on the depicted optical disk, the computer program 12 can be stored in any way which is suitable for the computer program product 11.

In general terms, the DSLAM 3 may monitor the downstream crosstalk coefficient of at least one line in a vectored group of DSL lines. In general terms, the term "crosstalk coefficient" as herein defined includes at least the crosstalk coefficients (i.e. so-called effective crosstalk coefficients) on the cable between the DSLAM 3 and the CPE 2a-n and precoding crosstalk coefficients with vectoring processing included which indicates the residual crosstalk coefficients (i.e., so-called residual crosstalk coefficients) after crosstalk cancellation by vectoring. Changes in such coefficients may indicate that a disconnect event has occurred. In general terms disconnect events causes a negative impact on the DSL system.

A method of mitigating disconnect events in a vectoring based digital subscriber line, DSL, system 1, comprises detecting, in a step S102 and by the processing unit 8 of the DSLAM 3, a loss of signal or disconnect event of a line in a vectored group of DSL lines. The loss of signal disconnect event causes a negative impact on the DSL system 1. The processing unit 8 is further arranged to, in a step S104, detect a change in at least one downstream, DS, crosstalk coefficient of at least one line in the vectored group of DSL lines. In order to determine how to handle the loss of signal or disconnect event at least the magnitude of the change is determined. The processing unit 8 is therefore arranged to, in a step S106 determine a magnitude of the change. It is further determined where the loss of signal or disconnect event has occurred. The processing unit 8 is therefore arranged to, in a step S108 determine where the disconnect event has occurred by processing precoding coefficients of the vectored group of DSL lines. A suitable action to mitigate the disconnect event may then determined. The processing unit 8 may therefore be arranged to, in a step S110, determine, on basis of the determined magnitude and where the disconnect event has occurred, an action to be performed by the DSLAM 3 so as to mitigate for the negative impact. However, according to embodiments the disconnect event is not mitigated and hence only a determination of the magnitude and where the loss of signal or disconnect event has occurred is provided.

The processing unit 8 may further be arranged to determine other properties of the change. Particularly, the processing unit 8 may further be arranged to, in a step S120a, determine the sign of the change in the at least one DS crosstalk coefficient. That is, it may thereby be determined whether the change is an increase or a decrease in the at least one DS crosstalk coefficient. This information may further be used to determine the action to be performed in order to mitigate the disconnect event. The processing unit 8 may therefore be arranged to, in a step S120b, determine the action to be performed by the DSLAM based on the determined sign. For example, an increase may be an indicator of a CPE disconnect event and a decrease may be an indicator of a CO disconnect event. Thus, the processing unit 8 may be arranged to, in a step S120c, determine the disconnect event to be a customer premises equipment, CPE, disconnect in a case the change is an increase of the at least one DS crosstalk coefficient. Likewise, the processing unit 8 may be arranged to, in a step S120d, determine the disconnect event to be a central office, CO, disconnect in a case the change is a decrease of the at least one DS crosstalk coefficient.

In VDSL2, see ITU-T, G.993.5 Amendment 1 of December 2011, a far end crosstalk, FEXT, downstream coupling coefficients, Xlinpsds, parameter may provide information indicating a disconnect event. The processing unit 8 may therefore be arranged to, in a step S122a, determine a far end crosstalk, FEXT, downstream coupling coefficients, Xlinpsds, parameter. The Xlinpsds parameter may be determined by a vectoring control entity in the DSLAM 3. The functionality of the vectoring control entity may be implemented in the processing unit 8. The Xlinpsds parameter may provide information that the disconnect event is a CPE disconnect event. The processing unit 8 may thus be arranged to, in a step S122b, determine, based on the Xlinpsds parameter, the disconnect event to be a customer premises equipment, CPE, disconnect event. If so the processing unit 8 may be arranged to, in a step S122c, determine, or set, a CPE-disconnect parameter indicating the disconnect event to be a CPE disconnect event. The Xlinpsds, parameter may alternatively provide information that the disconnect event is a CO disconnect event. The processing unit 8 may thus be arranged to, in a step S122b', determine, based on the Xlinpsds parameter, the disconnect event to be a central office, CO, disconnect event. If so the processing unit 8 may be arranged to, in a step S122c', determine, or set, a CO-disconnect parameter indicating the disconnect event to be a CO disconnect event. In general terms, there may be one single parameter which takes different values (for example by a flag being set) depending on whether it is to be a CPE-disconnect parameter or a CO-disconnect parameter. Alternatively, the CPE-disconnect parameter and the CO-disconnect parameter may be represented by individual parameters. The processing unit 8 may be arranged to, based on the Xlinpds parameter, determine if a CO disconnect event occurred, or determine if a CPE disconnect event occurred, or both of them occurred. As will be disclosed next, the classification of the disconnect event (such as being a CPE disconnect event or a CO disconnect event), may be based on additional and/or alternative factors, parameters, measurements, etc. There may be ways to mitigate the disconnect event based on the type of disconnect event and/or based on downstream or upstream.

Method Based on Fast Tracking

With CDE in DS, the crosstalk signal of the disconnected line is gone. This is equivalent to a situation where crosstalk channel coefficients from the disconnected line to the other lines are changed to zeros. From this point of view, the CDE causes a sudden change in crosstalk channel from non-zeros values to zeros. A fast tracking method may be used to track a sudden channel change by adapting the precoding coefficients quickly. According to fast tracking the precoding coefficients are adapted based on channel estimates. The processing unit 8 of the DSLAM 3 may therefore be arranged to, in a step S112a acquire channel estimates for other lines in the vectored group of DSL lines; and to in a step S112b adapt precoding coefficients of the other lines based on the acquired channel estimates. For CDE, fast tracking can quickly adjust the precoding coefficients to be sufficiently small so that the precoding crosstalk is below the noise floor. Further details relating to fast tracking are disclosed in the published international patent application WO 2011/152768.

Figure 6:
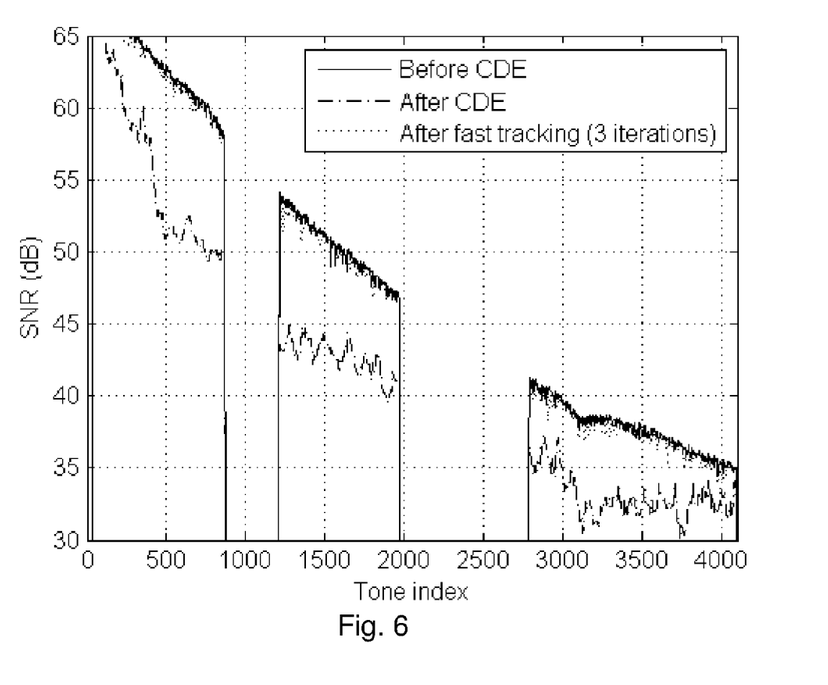
FIG. 6 schematically illustrates SNR of tones before CDE, after CDE and after fast tracking as a function of tone index.
Figure 7:
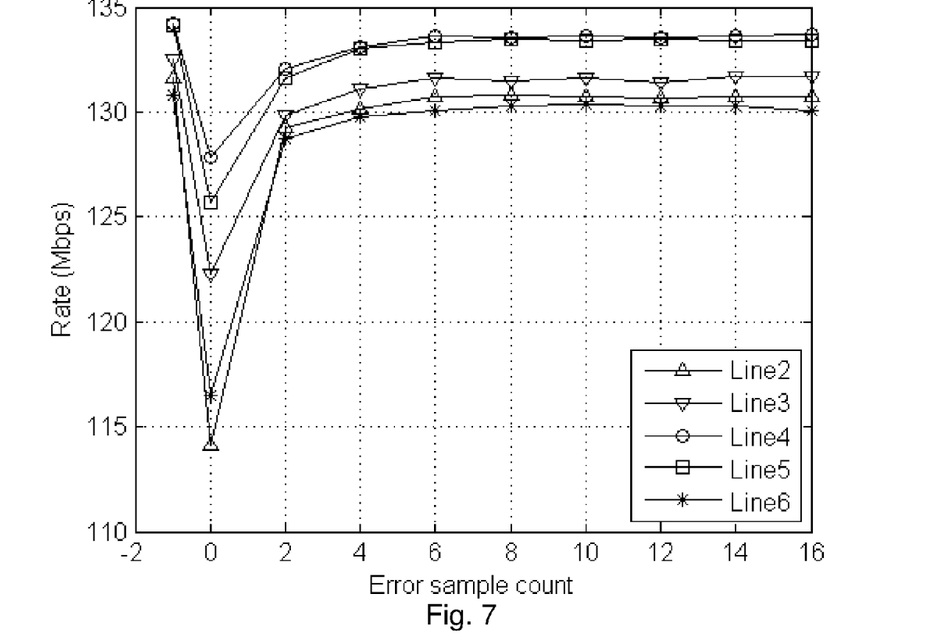
FIG. 7 schematically illustrates available bit rate during fast tracking as a function of error sample count.
Figure 8:
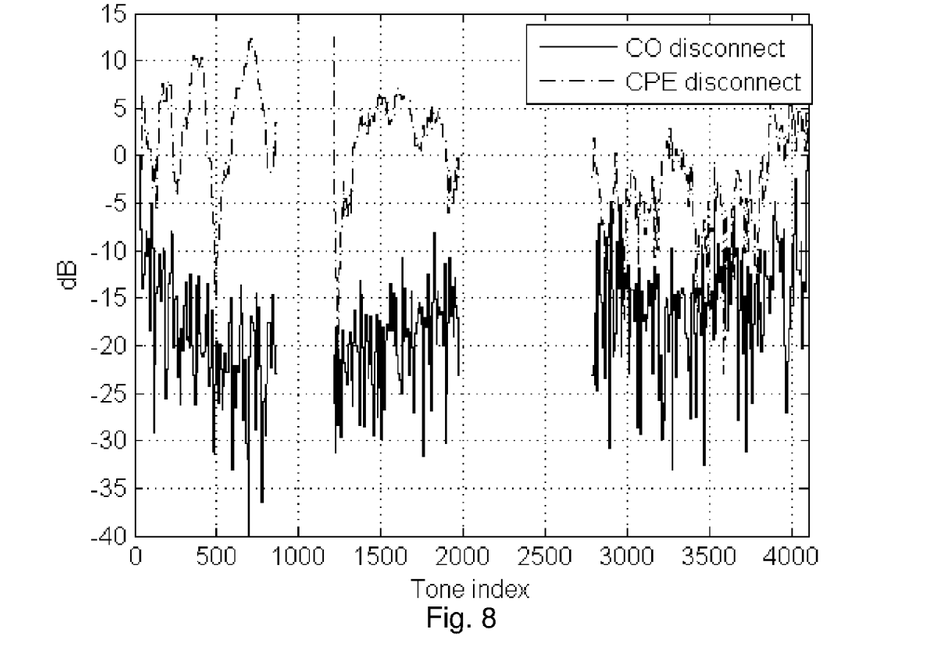
FIG. 8 schematically illustrates precoder coefficients magnitude in dB for CO disconnect and CPE disconnect as a function of tone index.
Figure 9:
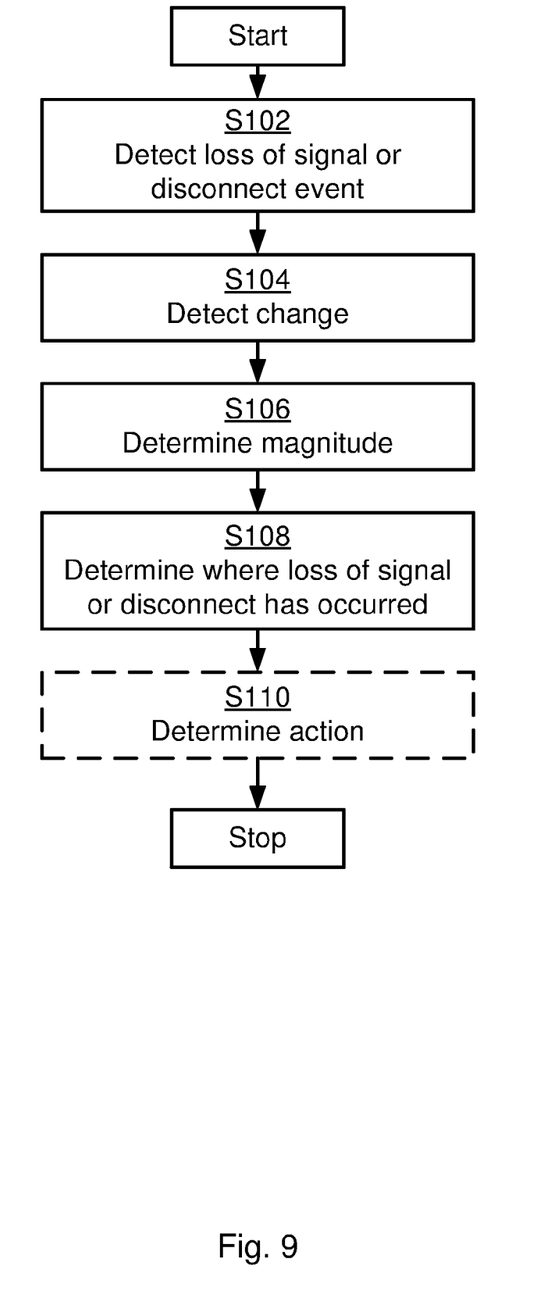
FIGS. 9 and 10a, 10b, 10c are flowcharts of methods according to embodiments.
Figure 10A:
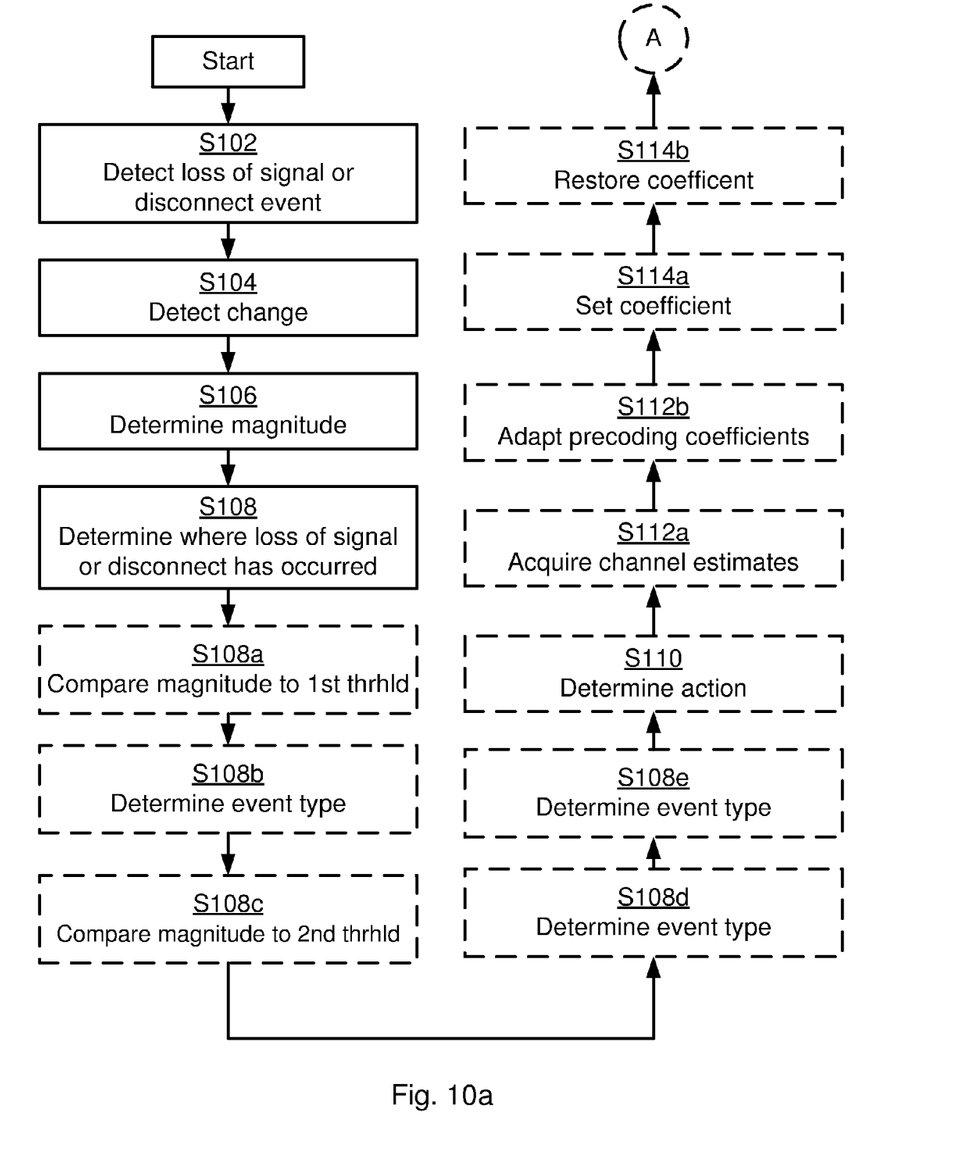
Figure 10B:
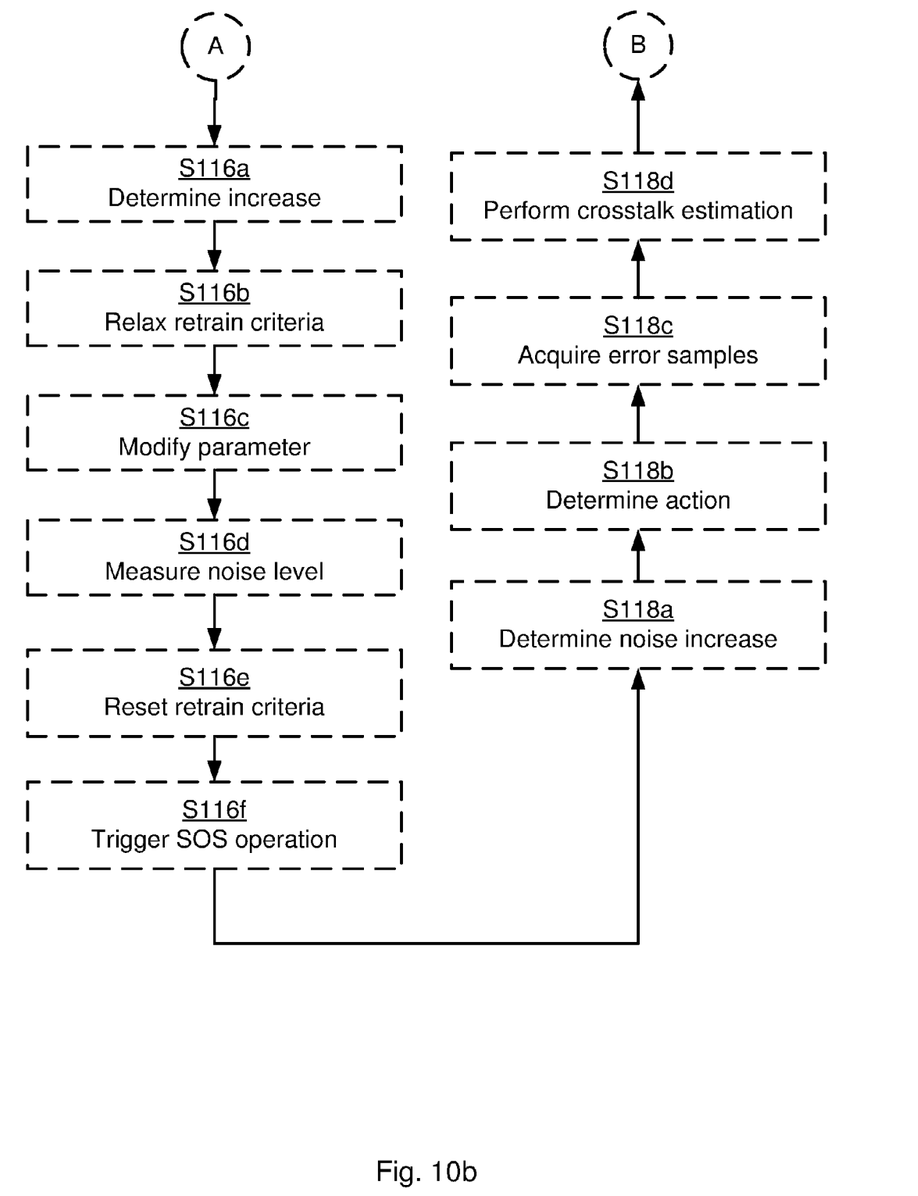
Figure 10C:
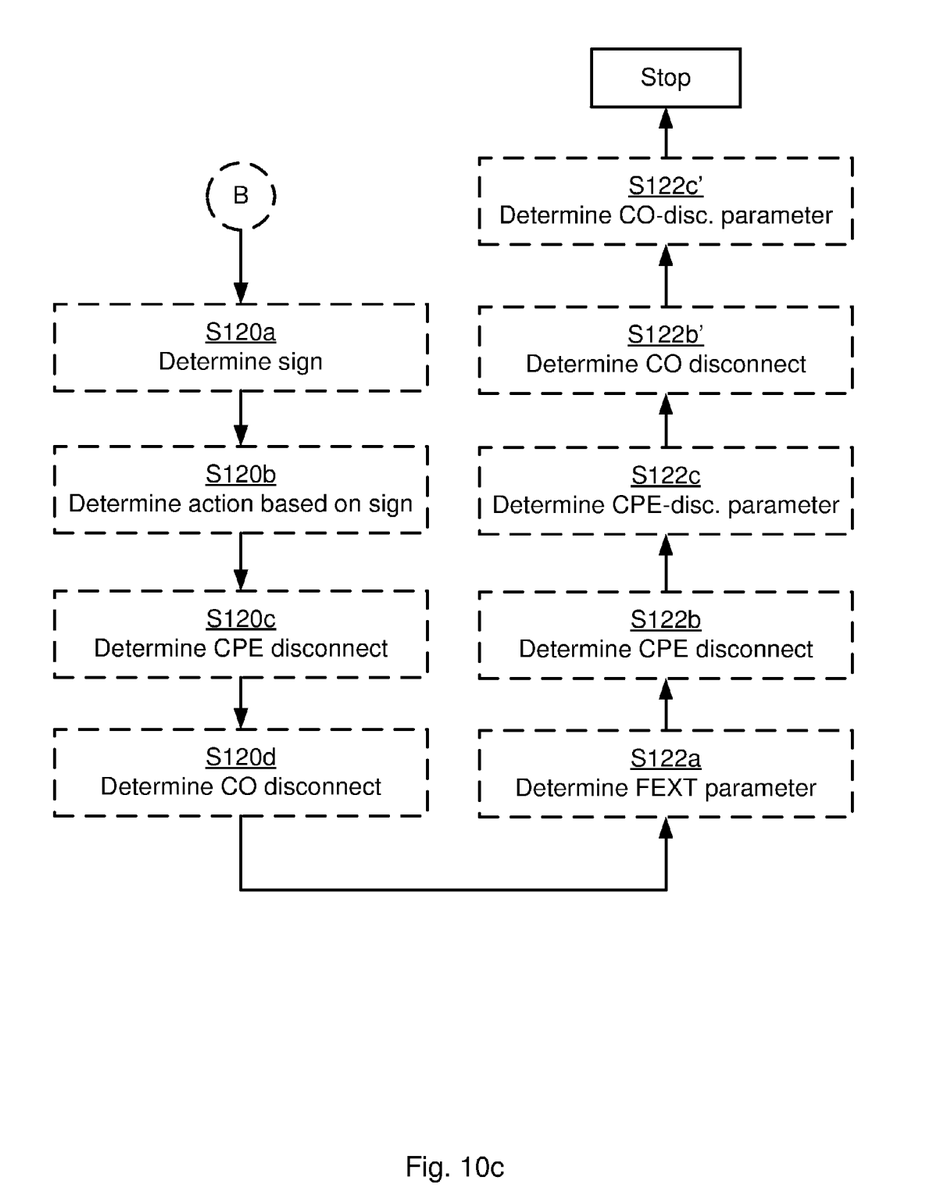

A simulation has been performed for a scenario with 6 lines. Line 1 is assumed disconnected at the CO side. FIG. 6 shows a comparison of the SNRs of line 2 before CDE, after CDE and after fast tracking. It shows that the SNR is significantly dropped due to CDE by up to about 10 dB, which is enough to cause line 2 to retrain. Fast tracking is able to recover the SNR to very close to the original SNR before the CDE after 3 iterations. FIG. 7 shows the available bit rate during the fast tracking process. All lines are recovered after the 1st iteration of fast tracking so that potential retrains are prevented. The performance quickly converges to be very close to the original bit rate in 3 iterations. Furthermore, FIG. 8 compares the precoder coefficients from line 1 to line 2 in the scenarios where line 1 is disconnected at the CO side and at the CPE side, respectively. The coefficients are normalized to the original precoder coefficients before the disconnect events. FIG. 9 shows that the coefficients are much smaller than the original coefficients for the CO disconnect event, while they are generally larger than the original coefficients for the CPE disconnect event (also referred to as a disorderly shutdown event). One reason is that the effective crosstalk coupling from the disconnected line to the other lines become zeros. Ideally, the corresponding precoder coefficients should be zeros too. Practically, fast tracking reduces the coefficients to sufficiently small values so that the crosstalk is lower than the noise floor. Reducing the coefficients to sufficiently small values may be performed in order to detect if the disconnection is at the CO side or the CPE side.

It has been shown above that fast tracking is effective to mitigate CDE. A CDE mitigation process according to this embodiment is triggered by loss of signal reported on one line, say line i. The noise level is first measured on the lines (line set $J_i$) which has a strong (or even the strongest) crosstalk relationship with line i. Limiting the number of lines for noise measurement may reduce the processing load. If noise is increased on any line, fast tracking is performed on these lines to quickly adapt the precoding coefficients. After fast tracking, the noise is measured again. If the noise has decreased, the precoder coefficients are compared to the original precoder coefficients. If the coefficients are smaller than before, it is determined that a CDE has occurred on line i. If the coefficients are not smaller than before, the disconnect event is determined as a CPE disconnect event (or disorderly shutdown event). Therefore, the herein disclosed embodiments provide a method for mitigating a general disconnect event at either the CO or the CPE. Thus, according to some embodiments the disconnect event occurred as a central office, CO, disconnect event, CDE. According to some embodiments the disconnect event occurred as a customer premises equipment, CPE, disconnect event. Furthermore, the disconnection can also occur at some point between the CO and the CPE. Thus, according to some embodiments the disconnect event occurred between a central office, CO, and a customer premises equipment, CPE, 2a, 2b, 2n. It can further be detected where the disconnect event occurred.

As disclosed above, using the precoding coefficients may differentiate if the disconnection occurs at the CO, the CPE or a point between the CO and the CPE. As noted above, the processing unit 8 of the DSLAM 3 is arranged to, in a step S108, determine where the disconnect event has occurred by processing precoding coefficients of the vectored group of DSL lines. Some criteria are listed below.

If the precoding coefficients were decreased more than threshold 1, the disconnect event it is detected as CO disconnect, If the precoding coefficients were decreased less than threshold 1 but more than threshold 2, the disconnect event is detected as a disconnect at somewhere in between the CO and the CPE, Otherwise, the disconnect event is determined to have occurred at the CPE.

The determination where the loss of signal or disconnect event has occurred may be based on an assumption that the amplitude of the detected change is related to the distance to the loss of signal or disconnect event from the DSLAM 3. That is, according to embodiments the processing unit 8 of the DSLAM 3 is arranged to, in a step S108*a*, compare a magnitude of at least one of the precoding coefficients, as adapted in step S112*b*, to a first predetermined threshold. The processing unit 8 may then be arranged to, in a step S108 *b*, determine that the disconnect event is a CO disconnect event, CDE, in a case the magnitude is below the first predetermined threshold. Comparison to the first threshold may thus determine whether or not the disconnect event is a CO disconnect event. However, since the disconnect event may alternatively be a CPE disconnect event or a disconnect event between the CO and the CPE the magnitude may further be compared to a second threshold. The processing unit 8 may therefore further be arranged to, in a step S108*c*, compare the magnitude to a second predetermined threshold. The second predetermined threshold is higher than the first threshold. The processing unit 8 may then be arranged to, in a step S108*d*, determine that the disconnect event has occurred between the CO and the CPE in a case the magnitude above the first predetermined threshold and below the second predetermined threshold. Comparison to the second threshold may thus determine whether or not the disconnect event occurred between the CO and the CPE or if the disconnect is a CPE disconnect. The processing unit 8 may therefore further be arranged to, in a step S108*e*, determine that the disconnect event is a CPE disconnect in a case the precoding coefficients are above the first predetermined threshold and above the second predetermined threshold. The value of the first predetermined threshold and the value of the second predetermined threshold may be dependent on the original precoding coefficients. For example, assume that original precoding coefficient PC-A is associated with the first predetermined threshold PT1-A and the second predetermined threshold PT2-A and that original precoding coefficient PC-B is associated with the first predetermined threshold PT1-B and the second predetermined threshold PT2-B. Then, if PC-A<PC-B, then according to embodiments also PT1-A<PT1-B as well as PT2-A<PT2-B hold.

According to embodiments the processing unit 8 of the DSLAM 3 is arranged to, in a step S118*a*, determine an increase in noise in the line of the vectored group of DSL lines. The action may then be determined, in a step S108 *b*, by the processing unit 8 based on the increase in noise. There are different ways to measure the noise level. Three typical examples of how to measure the noise level are provided below.

As a first example, the noise can be measured from error samples fed back from the CPE side. For example, averaging over several error samples may give a sufficient indication of the noise level. The reference noise level prior to the CDE can be measured from previous measurement of error samples. That is, the processing unit 8 may be arranged to, in a step S118*c*, acquire error samples from the customer premises equipment, CPE 2*a*, 2*b*, 2*n*.

As a second example, the noise can be measured from crosstalk estimation. In general terms, the noise variation is caused by precoding crosstalk variation. That is, the processing unit 8 may be arranged to determine the increase in noise by, in a step S118 *d*, performing crosstalk estimation. Thus the error sample based channel estimation scheme can be used to estimate the precoding crosstalk. Since the actual crosstalk from the disconnected line is gone, the results of the channel estimation are the precoding crosstalk coefficients. If the estimated crosstalk coefficients are higher than a predetermined threshold, it can be deemed that the noise is increased. Otherwise, the noise is deemed to have decreased. Note the predetermined threshold may be the residual crosstalk level before CDE, which are very low (normally lower than the noise floor) because of the effective crosstalk cancellation by vectoring. One benefit of using crosstalk channel estimation is that it can be performed by fast channel estimation, according to the fast tracking scheme disclosed above.

Some other line performance parameters such as signal to noise ratio (SNR) margin, FEC (forward error correction) counter values, cyclic redundancy check (CRC) errors, retransmission requests may also be used as noise level indicators. That is, according to embodiments determining the increase in noise is based on at least one line parameter from the group of: signal-to-noise, SNR, margin, forward error correcting code, FEC, counts, cyclic redundant check, CRC, errors, and retransmission request. Thus, as a third example, if the actual SNR margin is lower than the configured SNR margin, this could indicate that the noise is increased. In general terms, if the parameters indicate that the line quality is improved, this means that the noise is decreased; if the parameters indicate that the line quality is not improved, this means that the noise is increased.

Method without Fast Tracking

If fast tracking is not supported, the precoder crosstalk may be removed by clearing the precoding coefficients from the disconnected line to other lines (i.e., setting these coefficients to zeros or set the coefficients below the noise floor). Note: as disclosed with reference to embodiments relating to fast tracking, it is sufficient to set the precoding coefficients below the noise floor. That is, according to embodiments the processing unit 8 of the DSLAM 3 is arranged to, in a step S114$a$, set at least one precoding coefficient of the line in the vectored group of DSL lines to zero. It may then be investigated if setting the at least one precoding coefficient of the line in the vectored group of DSL lines to zero causes the DS noise in the lines to decrease. If this is the case then a CDE has been detected and mitigated. If this is not the case the fact that the DS noise in the lines has not decreased provides an indicator that the disconnect event is another type of disconnect than a CDE. The precoding coefficients may in such a case therefore be restored. Hence, according to embodiments the processing unit 8 of the DSLAM 3 is arranged to, in a step S114$b$, restore the at least one precoding coefficients of the vectored group of DSL lines to its original value. The processing unit 8 is arranged to do so in a case a noise level for the line in the vectored group of DSL lines has not decreased more than a predetermined amount as a result of setting at least one precoding coefficient of the vectored group of DSL lines to zero. Unlike fast tracking method, this method may only be used to mitigate and detect CDE.

Upstream Detection and Mitigation

In the US, the noise increase is due to the uncancelable crosstalk from the disconnected lines. According to embodiments the processing unit 8 of the DSLAM is arranged to, in a step S116$a$ determine an increase in upstream, US, noise levels for the line in the vectored group of DSL lines from a first level to a second level. After a noise increase is detected, the retrain criteria are first relaxed by the DSLAM 3 on the lines on which noise increase is detected. The processing unit 8 may thus be arranged to, in a step S116$b$, relax retrain criteria of the line. To relax the retrain criteria could mean in VDSL2 to instead of having 10 SES (Severely Errored Seconds) as retrain criteria modify this value to a longer value, for example a maximum of 31 seconds. In VDSL2 this would mean a configured of the parameter REINIT_TIME_THRESHOLDus (as defined in ITU-T G.997.1). Hence, according to embodiments the DSLAM 3 is arranged to, in a step S116$c$, modify the parameter REINIT_TIME_THRESHOLDus. This parameter could be modified at start-up (i.e. during an initialization phase) as well as during operation (i.e. during so-called "showtime"). This could facilitate CDE mitigation.

The processing unit 8 may further be arranged to, in a step S116$d$, measure US noise level estimates for the line in the vectored group of DSL lines prior during a predetermined time interval. The processing unit 8 may then be arranged to, in a step S116$e$, reset the retrain criteria of the vectored group of DSL lines to its original value in a case the US noise level estimates are not lower than the second level.

As noted above, one retrain criterion is that, in VDSL2, after 10 Severely Errored Seconds (SES) have been detected, the receiver should enter the retrain mode. According to the disclosed embodiments, the receiver is arranged to increase this number such that the line will not retrain before the disconnected line stop its transmission. This step is transparent to the CPE, because the retrain request is triggered by the US receiver which is located at the CO. This step may prevent the lines from performing retraining. According to the proposed VDSL2 standard, the disconnected CPE will stop its transmission in several seconds (e.g. 10 seconds). That is, according to embodiments the predetermined time interval is at least 5 seconds, preferably at least 10 seconds. Then the uncancelled US crosstalk is gone and the line qualities of the other lines return to the state before CDE.

SOS (Save-our-Showtime) is an online-reconfiguration scheme specified in VDSL2. Execution of the SOS online-reconfiguration scheme may cause the bit rate to be rapidly reduced in order to adapt to the increased noise. According to embodiments the processing unit 8 of the DSLAM 3 is arranged to, in a step S116$f$ trigger a save-our-showtime, SOS operation for the line. If SOS is enabled, triggering SOS operations may quickly reduce the bit rate to avoid packet errors. SRA (seamless rate adaptation) is another online-reconfiguration scheme specified in VDSL2. Execution of the SRA online-reconfiguration scheme may cause the bit rate to increase or decrease according to the line quality. If SRA is enabled on those lines, the bit rate will be reduced by SRA operations autonomously. The SRA will eventually stabilize the lines. The difference between SOS and SRA is that SOS is faster than SRA in rate reduction.

Performing noise measurements for the US may be regarded as less complicated than for the DS from the DSLAM side since the US receivers are located in the DSLAM. Similar to DS, the US error samples may be used to calculate noise level. From the error samples, crosstalk coefficients may also be estimated and then used as a noise indicator. A similar fast channel estimation scheme as for DS may be applied also for the US. Also like in DS, other line performance parameters can be use as noise indicator, such as SNR margin, FEC counter values, CRC errors, retransmission requests, etc.

The present disclosure has mainly been described above with reference to a few embodiments. However, as is readily appreciated by a person skilled in the art, other embodiments than the ones disclosed above are equally possible within the scope of the present disclosure, as defined by the appended patent claims.

For example, a method for determining a disconnect parameter in a vectoring based digital subscriber line, DSL, system 1, performed by a DSLAM 3 comprises determining (as in step S122$a$) a far end crosstalk, FEXT, downstream coupling coefficients, Xlinpsds, parameter; determining (as in step S122$b$), based on said Xlinpsds parameter, said disconnect event to be a customer premises equipment, CPE, disconnect event; and if so determining (as in step S122$c$) a CPE-disconnect parameter indicating said disconnect event to be a CPE disconnect event; or determining (as in step S122$b'$), based on said Xlinpsds parameter, said disconnect event to be a central office, CO, disconnect event; and if so determining (as in step S122$c'$) a CO-disconnect parameter indicating said disconnect event to be a CO disconnect event.

The invention claimed is:

1. A method of mitigating disconnect events in a vectoring based digital subscriber line, DSL, system, the method being performed by a digital subscriber line access multiplexer, DSLAM, comprising the steps of:
   detecting a loss of signal or disconnect event of a line in a vectored group of DSL lines, the loss of signal or disconnect event causing a negative impact on the DSL system;
   detecting a change in at least one downstream, DS, crosstalk coefficient of at least one line in said vectored group of DSL lines;
   determining a magnitude of said change;

determining where the loss of signal or disconnect event has occurred by processing precoding coefficients of the vectored group of DSL lines; and determining, on basis of the determined magnitude and where the disconnect event has occurred, an action to be performed by the DSLAM so as to mitigate for said negative impact.

2. The method according to claim 1, further comprising:
acquiring channel estimates for other lines in the vectored group of DSL lines; and
adapting precoding coefficients of said other lines based on the acquired channel estimates.

3. The method according to claim 1, wherein said action comprises the step of:
setting at least one precoding coefficient of said line in the vectored group of DSL lines to zero.

4. The method according to claim 3, further comprising:
restoring said at least one precoding coefficients of the vectored group of DSL lines to its original value in a case a noise level for said line in the vectored group of DSL lines has not decreased more than a predetermined amount as a result of setting at least one precoding coefficient of the vectored group of DSL lines to zero.

5. The method according to claim 1, further comprising:
determining an increase in upstream, US, noise levels for said line in the vectored group of DSL lines from a first level to a second level; and
relaxing retrain criteria of said line.

6. The method according to claim 5, further comprising:
modifying a REINIT_TIME_THRESHOLDus parameter to a value between 10 and 31 seconds.

7. The method according to claim 5, further comprising:
measuring US noise level estimates for said line in the vectored group of DSL lines prior during a predetermined time interval; and
resetting the retrain criteria of the vectored group of DSL lines to its original value in a case said US noise level estimates are not lower than said second level.

8. The method according to claim 7, wherein the predetermined time interval is at least 10 seconds.

9. The method according to claim 5, further comprising:
triggering a save-our-showtime, SOS operation for said line.

10. The method according to claim 1, wherein the disconnect event occurred as a central office, CO, disconnect event, CDE.

11. The method according to claim 1, wherein the disconnect event occurred as a customer premises equipment, CPE, disconnect event.

12. The method according to claim 1, wherein the disconnect event occurred between a central office, CO, and a customer premises equipment, CPE.

13. The method according to claim 2, further comprising:
comparing a magnitude of at least one of said adapted precoding coefficients to a first predetermined threshold; and
determining that the disconnect event is a CO disconnect event, CDE, in a case said magnitude is below said first predetermined threshold.

14. The method according to claim 13, further comprising:
comparing said magnitude to a second predetermined threshold higher than said first threshold; and
determining that the disconnect event has occurred between said CO and said CPE in a case said magnitude above said first predetermined threshold and below said second predetermined threshold.

15. The method according to claim 14, further comprising:
determining that the disconnect event is a CPE disconnect in a case said precoding coefficients are above said first predetermined threshold and above said second predetermined threshold.

16. The method according to claim 1, further comprising:
determining an increase in noise in said line of the vectored group of DSL lines; and
determining said action to be performed by the DSLAM based on said increase in noise.

17. The method according to claim 16, wherein determining said increase in noise involves:
acquiring error samples from the customer premises equipment, CPE.

18. The method according to claim 17, wherein determining said increase in noise involves:
performing crosstalk estimation.

19. The method according to claim 17, wherein determining said increase in noise is based on at least one line parameter from the group of: signal-to-noise, SNR, margin, forward error correcting code, FEC, counts, cyclic redundant check, CRC, errors, and retransmission request.

20. The method according to claim 1, further comprising:
determining the sign of said change in said at least one DS crosstalk coefficient; and
determining said action to be performed by the DSLAM based on said determined sign.

21. The method according to claim 20, further comprising:
determining the disconnect event to be a customer premises equipment, CPE, disconnect in a case said change is an increase of said at least one DS crosstalk coefficient.

22. The method according to claim 21, further comprising:
determining the disconnect event to be a central office, CO, disconnect in a case said change is a decrease of said at least one DS crosstalk coefficient.

23. The method according to claim 1, further comprising:
determining a far end crosstalk, FEXT, downstream coupling coefficients, Xlinpsds, parameter;
determining, based on said Xlinpsds parameter, said disconnect event to be a customer premises equipment, CPE, disconnect event; and if so
determining a CPE-disconnect parameter indicating said disconnect event to be a CPE disconnect event; or
determining, based on said Xlinpsds parameter, said disconnect event to be a central office, CO, disconnect event; and if so
determining a CO-disconnect parameter indicating said disconnect event to be a CO disconnect event.

24. A digital subscriber line access multiplexer, DSLAM, for mitigating disconnect events in a vectoring based digital subscriber line, DSL, system, comprising:
a processing unit arranged to detect a loss of signal or disconnect event of a line in a vectored group of DSL lines, the loss of signal or disconnect event causing a negative impact on the DSL system;
the processing unit further being arranged to detect a change in at least one downstream, DS, crosstalk coefficient of at least one line in said vectored group of DSL lines;
the processing unit further being arranged to determine a magnitude of said change;

the processing unit further being arranged to determine where the loss of signal or disconnect event has occurred by processing precoding coefficients of the vectored group of DSL lines; and the processing unit further being arranged to determine, on basis of the determined magnitude and where the loss of signal or disconnect event has occurred, an action to be performed by the DSLAM so as to mitigate for said negative impact.

25. A non-transitory computer readable medium comprising a computer program for mitigating disconnect events in a vectoring based digital subscriber line, DSL, system, the computer program comprising computer program code which, when run on a digital subscriber line access multiplexer, DSLAM, causes the DSLAM to:

detect a loss of signal or disconnect event of a line in a vectored group of DSL lines, the loss of signal or disconnect event causing a negative impact on the DSL system;

detect a change in at least one downstream, DS, crosstalk coefficient of at least one line in said vectored group of DSL lines;

determine a magnitude of said change;

determine where the loss of signal or disconnect event has occurred by processing precoding coefficients of the vectored group of DSL lines; and determine, on basis of the determined magnitude and where the loss of signal or disconnect event has occurred, an action to be performed by the DSLAM so as to mitigate for said negative impact.

* * * * *

UNITED STATES PATENT AND TRADEMARK OFFICE
CERTIFICATE OF CORRECTION

PATENT NO. : 9,531,866 B2
APPLICATION NO. : 14/653286
DATED : December 27, 2016
INVENTOR(S) : Lu et al.

It is certified that error appears in the above-identified patent and that said Letters Patent is hereby corrected as shown below:

On the Title Page

In Item (56), under "U.S. PATENT DOCUMENTS", in Column 2, Line 4, delete "Cendrillon" and insert -- Cendrillon et al. --, therefor.

In Item (56), under "OTHER PUBLICATIONS", in Column 2, Line 4, delete ""Very high speed" and insert -- "Very high bit-rate --, therefor.

In the Drawings

In Fig. 5, Sheet 3 of 8, delete "Backlground" and insert -- Background --, therefor.

In Fig. 10a, Sheet 6 of 8, for Tag "S114b", in Line 1, delete "coefficent" and insert -- coefficient --, therefor.

In the Specification

In Column 1, Line 18, delete "(VDSL; Very-high-speed" and insert -- (VDSL: Very-high-bit-rate --, therefor.

In Column 1, Line 35, delete "Multiplexer" and insert -- Multiplexer) --, therefor.

In Column 2, Line 16, delete "impact" and insert -- impact. --, therefor.

In Column 7, Line 3, delete "S106" and insert -- S106, --, therefor.

In Column 7, Line 6, delete "S108" and insert -- S108, --, therefor.

Signed and Sealed this
Nineteenth Day of September, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,531,866 B2

In Column 7, Line 57, delete "Xlinpsds," and insert -- Xlinpsds --, therefor.

In Column 9, Line 48, delete "S108 b," and insert -- S108b, --, therefor.

In Column 10, Line 18, delete "S108 b," and insert -- S118b, --, therefor.

In Column 10, Line 35, delete "S118 d," and insert -- S118d, --, therefor.

In Column 12, Line 30, delete "use" and insert -- used --, therefor.